United States Patent [19]

Tsuchiya et al.

[11] Patent Number: 4,958,187
[45] Date of Patent: Sep. 18, 1990

[54] IMAGE FORMING APPARATUS FOR SCANNING BOTH SIDES OF AN ORIGINAL AND PRODUCING A DUPLEX COPY

[75] Inventors: Hiroaki Tsuchiya; Kimio Nakahata, both of Kanagawa, Japan

[73] Assignee: Canon Kabushiki Kaisha, Tokyo, Japan

[21] Appl. No.: 153,919

[22] Filed: Feb. 9, 1988

[30] Foreign Application Priority Data

Feb. 13, 1987 [JP] Japan ............................. 62-029547
Feb. 17, 1987 [JP] Japan ............................. 62-032351

[51] Int. Cl.$^5$ ............................................. G03G 21/00
[52] U.S. Cl. ................................. 355/202; 355/23; 355/24; 355/319; 355/320; 358/300
[58] Field of Search .............. 355/3 TR, 14 TR, 23, 355/24, 46, 233, 319, 320, 202, 309, 313; 358/300; 346/160

[56] References Cited

U.S. PATENT DOCUMENTS

| | | | |
|---|---|---|---|
| 3,536,398 | 10/1970 | Bhagat | 355/23 X |
| 3,580,670 | 5/1971 | Bhagat | 355/23 X |
| 3,697,171 | 10/1972 | Sullivan | 355/24 X |
| 3,775,102 | 11/1973 | Punnett | 355/24 X |
| 3,936,171 | 2/1976 | Brooke | 355/23 X |
| 4,076,407 | 2/1978 | Place | 355/14 TR |
| 4,413,899 | 11/1983 | Karasawa et al. | 355/14 TR X |
| 4,571,636 | 2/1986 | Itoh | 355/23 X |
| 4,674,866 | 6/1987 | Tanaka | 355/23 |

FOREIGN PATENT DOCUMENTS

62-27350 2/1987 Japan .

Primary Examiner—Fred L. Braun
Attorney, Agent, or Firm—Fitzpatrick, Cella, Harper & Scinto

[57] ABSTRACT

In a duplex image forming apparatus, first and second image forming devices are arranged respectively in upstream and downstream sides of a moving direction of a transfer member. Each image forming device includes an image bearing member, a developer for forming on the image bearing member a toner image corresponding to first and second information signals, respectively, and a transfer device for transferring the respective toner images to respective sides of the transfer member. A reader is provided for reading a first side of an original and, at a point of time after reading of the first side begins, a second side of the original. The length of time required to move the transfer member from the first transfer station to the second transfer station is equal to the length of time between beginning to read the first side of the original and beginning to read the second side of the original. Advantageously, the electric polarity used to transfer the first toner image to the first side of the transfer member is opposite to that required to transfer the second toner image to the second side of the transfer member.

8 Claims, 3 Drawing Sheets

IMAGE FORMING APPARATUS FOR SCANNING BOTH SIDES OF AN ORIGINAL AND PRODUCING A DUPLEX COPY

BACKGROUND OF THE INVENTION

1. Field of the Invention

This invention relates to an image forming apparatus which is capable of forming images on both sides of a transfer member.

2. Description of the Related Art

Figure 1:
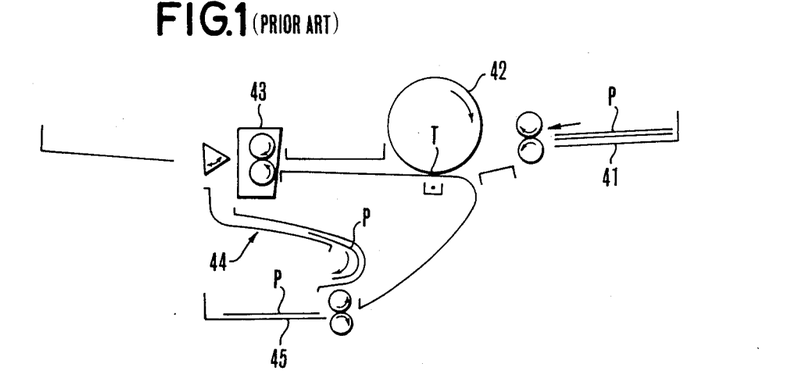
FIG. 1 is a schematic illustration of the conventional apparatus.

There has been known apparatuses of the kind arranged to be capable of forming images on both sides of a transfer member. An example of them is arranged as shown in FIG. 1 of the accompanying drawings. A first toner image which is formed on a photosensitive member drum 42 is transferred at a transfer station T to the first side of a transfer member P which is supplied from a paper supply cassette 41. Following this, the transfer member P is separated from the photosensitive member drum 42. The first toner image is then fixed to the transfer member P by a fixing device 43. The transfer member P is supplied via a reversing device 44 to a paper feed tray 45 to be stowed thereon. Next, the transfer member P is supplied from the paper feed tray 45 to the drum 42 with the second side of the transfer member P facing to the drum surface. A second toner image which is newly formed on the drum 42 is then transferred at the transfer station T to the second side of the transfer member P. The fixing device 43 fixes the second toner image to the transfer member P and moves the transfer member P to the outside.

However, the above stated conventional arrangement has presented the following problem. In copying the images on both sides of the transfer member P, an image is first transferred and fixed to the first side of the transfer member P. Following that process, the transfer member P is temporarily stowed on the paper feed tray 45 before copying another image on the second side of the transfer member P. This arrangement requires two periods of time for copying the images on the upper and reverse sides of the transfer member P respectively. Therefore, even in the case of an apparatus which is capable of speedily accomplishing single side copying, the conventional arrangement has necessitated a more than two times longer period of time for dual-side copying than single-side copying. This has caused a drop in a reproducible number of sheets, or copying speed, per unit time.

In connection with this problem, U.S. Pat. Nos. 3,536,398 and No. 3,580,670 have disclosed image forming means of the kind having two sets of image forming means which are arranged to include fixing devices respectively and to continuously transfer and fix images onto both sides of a transfer member one after another. However, the use of a plurality of fixing devices presents another problem as it results in an increase in the power consumption and also in an increase in size of the apparatus. Meanwhile, an apparatus of another kind has been disclosed in U.S. Pat. Nos. 3,775,102. That apparatus uses only one fixing device and is arranged to transfer images to first and second sides of a transfer member one after another and then to fix the images to the first and second sides. In that case, however, the image on the first side tends to be disturbed in transferring another image to the second side.

SUMMARY OF THE INVENTION

It is a principal object of this invention to provide an improvement in the image forming apparatus of the kind arranged to be capable of forming images on both sides of a transfer member.

It is another object of the invention to provide an image forming apparatus which is not only capable of forming images on both sides of a transfer member but is also capable of saving electric energy consumption.

It is a further object of the invention to provide an image forming apparatus which is capable of adequately forming images on both sides of a transfer member.

Other objects and features of this invention will become apparent from the following detailed description of embodiments thereof taken in connection with the accompanying drawings.

Figure 2:
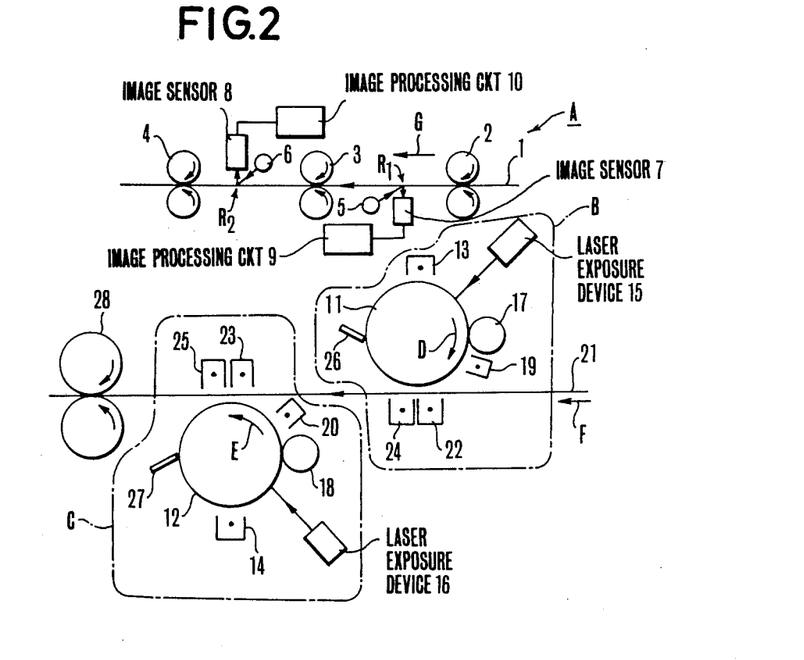
FIG. 2 is an illustration of an image forming apparatus to which this invention is applied.
Figure 3:
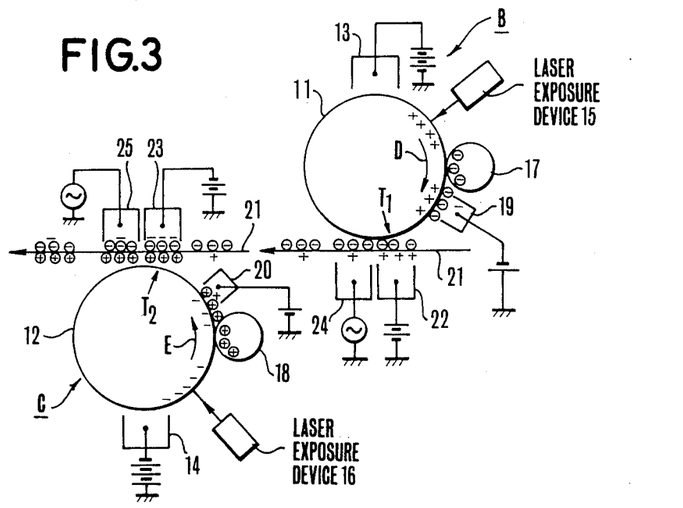
FIG. 3 is an illustration of first image forming means and second image forming means which are arranged within an embodiment of this invention.

DETAILED DESCRIPTION OF THE PREFERRED EMBODIMENTS:

Referring to FIGS. 2 and 3, an image reading device A is arranged as follows An original 1 is fed by feed rollers 2, 3 and 4 in the direction of arrow G. At a first reading station R1, a first side (or a lower side as viewed on the drawing) of the original 1 is illuminated by a light source 5. An image sensor 7 which is arranged to convert photo information of a CCD, etc. into an electrical signal reads out an image from the original 1. Meanwhile, a second side (or an upper side as viewed on the drawing) of the original 1 is illuminated at a second reading station R2 by a light source 6 to have an image thereof read out by an image sensor 8 which includes a CCD, etc. Image information from the image sensors 7 and 8 are supplied to image processing circuits 9 and 10. The image processing circuit 9 is arranged to form a first image signal which corresponds to the first side of the original 1, and the image processing circuit 10 is arranged to form a second image signal which corresponds to the second side of the original 1.

FIG. 3 shows the states of electric charge in a first image forming means B and a second image forming means C shown in FIG. 2. The first image forming means B includes an electrophotographic photosensitive member drum 11 which is arranged to rotate in the direction of arrow D; a primary charger 13 which is arranged to uniformly charge the surface of the photosensitive member drum 11 to the positive polarity; and a laser exposure device 15 which is arranged to form information light corresponding to the first image signal produced from the above stated image processing circuit 9 and to form an electrostatic latent image by illuminating the surface of the photosensitive drum 11 with the information light. Further, in the first image forming means B, a developing device 17 is arranged to develop the above stated electrostatic latent image. The developing device 17 forms a toner image on the drum by supplying a toner (a powdered developer material) which is charged to the negative polarity, i.e. to the polarity opposite to the charging polarity of the charger 13. A post charger 19 is arranged to further give a negative charge to the toner image. A transfer charger 22 is arranged to operate as transferring means with a positive voltage applied thereto for the purpose of transferring the negative toner image formed on the photosensitive member drum 11 to the first side (an upper side as viewed on the drawing) of a transfer member 21 which is made of paper or the like. A separation charger 24 is arranged to separate the transfer member 21 from the photosensitive member drum 11 by removing electric energy from the transfer member 21 by an AC discharge process. A cleaner 26 is arranged to remove a residual toner remaining on the photosensitive member drum 11.

The second image forming means C is arranged as follows. An electrophotographic photosensitive member drum 12 is arranged to rotate in the direction of arrow E. A primary charger 14 is arranged to uniformly charge the surface of the drum 12 to the negative polarity which is opposite to the polarity to which the above stated charger 13 is charging. A laser exposure device 16 is arranged to form an electrostatic latent image by forming information light corresponding to a second image signal produced from the image processing circuit 10 of the above stated image reading device A and by illuminating the surface of the photosensitive member drum 12 with the information light. A developing device 18 for developing the electrostatic latent image is arranged to form a toner image by supplying the photosensitive member drum 12 with a toner charged to the positive polarity which is opposite to the electric charge polarity of the charger 14. A post charger 20 is arranged to further apply a positive electric charge to the toner image. A transfer charger 23 has a negative voltage applied thereto for transferring the positive toner image formed on the photosensitive member drum 12 to the second side (the lower side as viewed on the drawing) of the transfer member 21. A separation charger 25 is arranged to separate the transfer member 21 from the photosensitive member drum 12 by removing the electric charge by an AC discharging process. A cleaner 27 is arranged to remove a residual toner from the surface of the drum 12. A fixing device 28 is arranged to fix the toner image which has not been fixed.

With the image forming apparatus of this embodiment arranged as described above, images are formed on both sides of the transfer member 21 in the following manner: The transfer member 21 is moved in the direction of arrow F at a timing corresponding to the timing at which images of the original 1 are read out at the above stated image reading device A. The first toner image which is of the negative polarity and has been formed on the photosensitive member drum 11 by the first image forming means B is attracted and transferred to the first side (or the upper side as viewed on the drawing) of the transfer member 21 at a first transfer station T1 by an electrostatic force obtained from the transfer charger 22 to which a positive voltage is applied from the second side of the transfer member 21. Following this, the transfer member 21 is separated from the photosensitive member drum 11 and comes to the second image forming means C. Then, the second toner image which is of the positive polarity and has been formed on the photosensitive member drum 12 is attracted and transferred to the second side of the transfer member 21 at a second transfer station T2 by virtue of an electrostatic force coming from the transfer charger 23 to which a negative voltage is applied from the first side of the transfer member 21. The transfer member 21 is separated from the photosensitive member drum 12 and comes to the fixing device 28. The toner images transferred to the first and second sides of the transfer member 21 are respectively heated and pressed to be fixed to the transfer member 21. The formation of images on the upper and reverse sides of the transfer member 21 thus comes to an end.

In the embodiment described, a positive voltage is applied to the transfer charger 22 to cause the toner image of the negative polarity to be transferred to the first side of the transfer member 21. Meanwhile, a negative voltage is applied to the other transfer charger 23 to cause the toner image of the positive polarity to be transferred to the second side of the transfer member 21. Therefore, in transferring the second toner image by the second image forming means C, the polarity of the transfer charger 23 is the same as that of the first toner image which has already been transferred to the first side of the transfer member 21. Accordingly, the electrostatic force which acts on the first toner image is exerted downward to push the toner image against the transfer member 21 to have the first toner image not readily disturbed. This also prevents the toner from sticking to the electrode wire of the transfer charger 23. Further, since the second toner image which is of the positive polarity opposite to the polarity of the first toner image is transferred to the second side of the transfer member 21, the toner images on both sides of the transfer member 21 attract each other by their electrostatic forces. The mutual attraction effectively prevents the first and second toner images from being disturbed during the feeding process of the transfer member 21 before the fixing process. With the second toner image thus arranged to be continuously transferred by the second image forming means C to the opposite side of the transfer member 21 without disturbing the unfixed first toner image formed by the first image forming means B, the embodiment obviates the necessity of providing fixing means, for example, in between the two image forming means B and C. This not only saves electric energy consumption but also permits reduction in size and cost of the apparatus.

Figure 4:
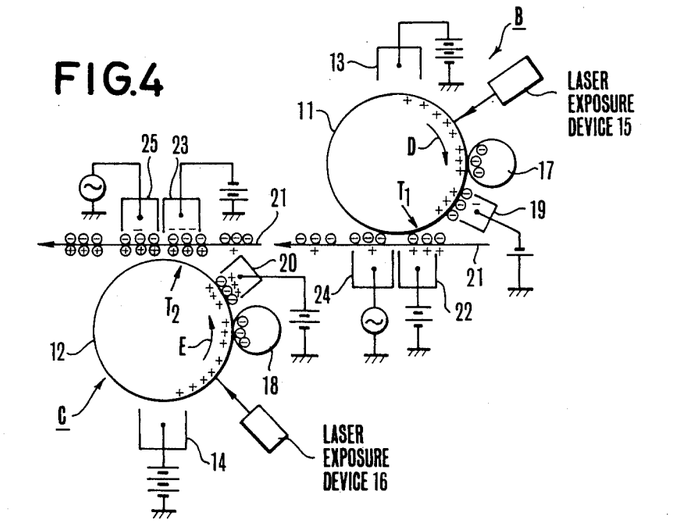
FIG. 4 is an illustration of first and second image means arranged for another embodiment of the invention.

FIG. 4 shows another embodiment of the invention. In this case, the second image forming means C is arranged as follows. The charger 14 charges the surface of the photosensitive member drum 12 to the positive polarity which is the same as the charging polarity of the charger 13. The developer material to be supplied from the developing device 18 to the drum 12 is arranged to be a toner of the negative polarity. After the latent image is developed, the post charger 20 charges, before transfer, the toner to the positive polarity which is opposite to the polarity of the first toner image. With the exception of this, the embodiment of the invention shown in FIG. 4 is arranged in the same manner as the embodiment shown in FIG. 3. The arrangement of the embodiment permits further reduction in cost of the apparatus as it permits common use of components for both the two image forming means B and C, although the post charger 20 must be arranged to have a larger output.

Figure 5:
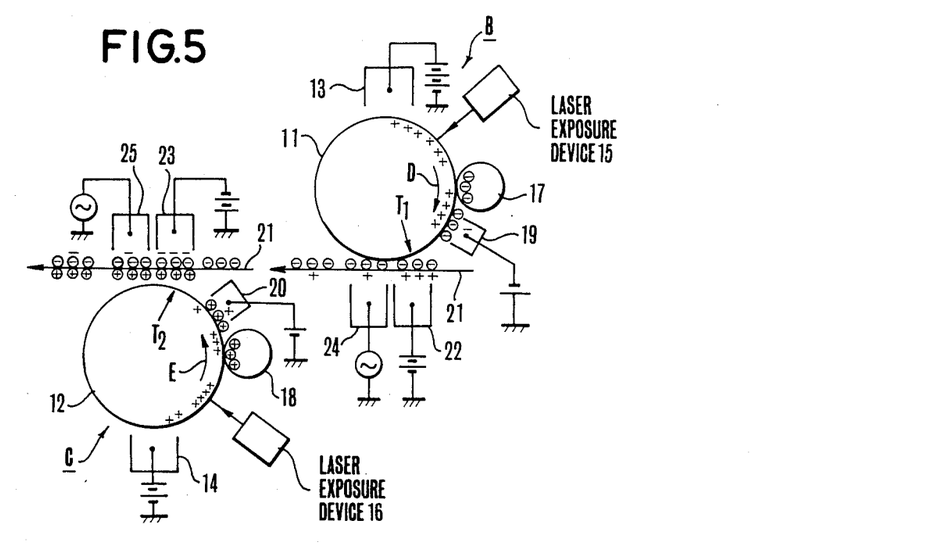
FIG. 5 is an illustration of first and second image forming means arranged for a further embodiment of the invention.

FIG. 5 shows a further embodiment of the invention. In the second image forming means C in that case, the charger 14 charges the surface of the drum 12 to the positive polarity which is the same as the charging polarity of the charger 13. The developer material supplied from the developing device 18 to the drum 12 is arranged to be a positive toner. This positive toner is allowed to stick to the parts of the drum 12 which are caused to have a lower potential by the exposure effecting action of the exposure device 16 for a process called reversal development. With the exception of that, the embodiment of FIG. 5 is arranged in the same manner as the embodiment shown in FIG. 2.

The arrangement for the reversal development process is applicable also to the first image forming means B of the embodiment shown in FIG. 4. In that case, the developing device 17 is arranged to supply a positively charged toner to the drum 11 to have it stick to the parts of the drum 11 which are caused to be at a lower potential by the exposure action of the exposure device 15. The positive polarity of a toner image thus obtained is inverted to the negative polarity by the charger 19 and is then transferred to the first side of the transfer member 21 by the transfer charger 22.

Further, the arrangement for the reversal development is also applicable to the first image forming means B of FIG. 5. In this instance, the developing device 17 is arranged to supply a positively charged toner to the drum 11 to have it stick to the surface parts of the drum 11 which are caused to be at a lower potential as a result of an exposure effected by the exposure device 15. The positive polarity of a toner image thus obtained is inverted to the negative polarity by the charger 19 and is then transferred to the first side of the transfer member 21 by the transfer charger 22.

The reversal development arrangement is likewise applicable to each of the first and second image forming means B and C of the embodiment which is shown in FIG. 3.

Further, in cases where the toner having the polarity which is opposite to the charge polarity of the photosensitive member drum is to be supplied to the photosensitive member drum in each of the embodiments described, the toner sticks to the surface parts of the photosensitive member drum which have not been exposed by the exposure device and thus remain at a higher potential.

In each of the embodiments described with reference to FIGS. 3, 4 and 5, a positive voltage is applied to the transfer charger 22 of the first image forming means B in such a way as to have the first toner image which is of the negative polarity transferred to the first side of the transfer member 21, while a negative voltage is applied to the transfer charger 23 of the second image forming means C to have the second toner image which is of the positive polarity transferred to the second side of the transfer member 21. However, this arrangement may be changed to conversely arrange the polarities of all the first and second toner images and the transfer chargers 22 and 23.

In the case of the embodiment shown in FIG. 2, the moving speed of the original 1 and that of the transfer member 21 are arranged to be equal to each other. A spacing distance between the first and second transfer stations T1 and T2 of the first and second image forming means B and C is arranged to be equal to a spacing distance between the first and second image reading stations R1 and R2 of the image reading means A. This means that a period of time required for moving the transfer member 21 from the first transfer station T1 to the second transfer station T2 is equal to a period of time required for moving the original 1 from the first reading station R1 to the second reading station R2. Therefore, a registration roller which is not shown is arranged to have the transfer member 21 to begin to be fed before the first toner image is formed in such a way as to have the timing of arrival of the original 1 at the first image reading station R1 coincide with the timing of arrival of the transfer member 21 at the first transfer station T1. This arrangement automatically enables the timing of arrival of the original 1 at the second image reading station R2 to coincide with the timing of arrival of the transfer member 21 at the second transfer station T2. By virtue of this, the images can be formed on both sides of the transfer member 21 with no positional deviation without recourse to any arrangement that otherwise must be made to have registration means for temporarily stopping the transfer member 21 between the first and second image forming means B and C and to have image information of the original 1 temporarily stored at a memory (or storage means) with some synchronizing arrangement to have the image information sent out from the memory at a timing corresponding to the timing of arrival of the transfer member 21 at the second transfer station T2.

While the moving speed of the original 1 is arranged to be equal to that of the transfer member 21 in the case of the embodiment described, this invention is not limited to that arrangement. Assuming that the moving speed of the original 1 is V1, and the moving speed of the transfer member 21 is V2 which differs from the speed V1, a distance (1 between the original reading stations R1 and R2 and a distance (2 between the transfer stations T1 and T2 are set at such values that satisfy the following relation:

$$l1/v1 = l2/v2$$

Figure 6:
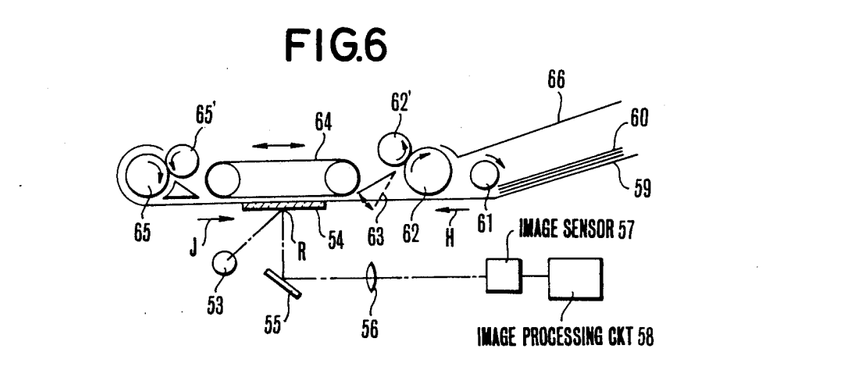
FIG. 6 is an illustration of an example of original reading devices to which this invention is applicable.

FIG. 6 shows another example of arrangement of the image reading means of an image forming apparatus which embodies this invention. Referring to FIG. 6, the image forming means is arranged to illuminate an original on a copyboard glass 54 with a light flux emitted from a light source 53. An image of the original obtained at a reading station R is formed via a mirror 55 and a lens 56 on an image sensor 57 which includes a CCD (a charge coupled device), etc. An electrical signal which is thus obtained at the image sensor 57 is supplied to an image processing circuit 58, where an image signal for driving a laser exposure device is formed. An original moving means for moving an original 60 includes a paper feed roller 61; a pair of rollers 62 and 62'; a moving path changing flapper 63; a conveyor belt 64; and another pair of rollers 65 and 65'. The original 60 on a paper feed tray 59 is moved by the paper feed roller 61 and is conveyed in the direction of arrow H beneath the roller 62. The original 60 thus moves along the copyboard glass 54 below the flapper 63. At a reading station R which is located below the conveyor belt 64, an image on the first side of the original 60 is read out. Following this, the original 60 is turned over by the roller pair 65 and 65' and further moves in the direction of arrow J with the first side thereof from which the image has been read out facing upward and the second side thereof facing downward. Then, the conveyor belt 64 causes the original 60 to pass the reading station R once again. This time, an image on the second side of the original 60 is read out. After that, the original 60 moves over the flapper 63 which is then in a position as indicated by a broken line and the original 60 is discharged on a paper discharge tray 66 via the roller pair 62 and 62'.

In the apparatus using the image reading means of FIG. 6, a distance between the first transfer station T1 and the second transfer station T2 is also set, like in the case of the foregoing embodiment, in such a manner that a period of time after arrival of the original 60 at the reading station R for the firs time and before it comes back to the reading station R through the roller pair 65 and 65' is equal to a period of time required for moving the transfer member 21 between the first and second transfer stations T1 and T2. The images on the first and second sides of the original 60 are arranged to be read out in common by an optical system and an image sensor. Further, a path length for conveying the original can be shortened by the arrangement of the embodiment. The embodiment shown in FIG. 6, therefore, permits reduction in size and cost of the apparatus.

What is claimed is:

1. An image forming apparatus capable of forming images on a first side of a moving transfer member and on a second side thereof reverse to said first side, respectively, comprising:

first image forming means including a first image bearing member, means for forming on the first image bearing member a first toner image corresponding to a first information signal, and first transfer means for transferring said first toner image to the first side of said transfer member at a first transfer station;

second image forming means including a second image bearing member, means for forming on the second image bearing member a second toner image corresponding to a second information signal, and second transfer means for transferring said second toner image to the second side of said transfer member at a second transfer station located on the downstream side of said first transfer station in a moving direction of said transfer member; and reading means for reading a first side of a moving original to form said first information signal and for reading a second, opposite, side of the moving original to form said second information signal, said reading means being arranged to begin to read the second side of said original at a point of time after another point of time at which reading the first side of said original begins;

wherein the moving speed of said transfer member is different from the moving speed of the original; and wherein a length of time required by said transfer member to move from said first transfer station to said second transfer station is equal to a length of time between said point of time at which reading said first side of the original begins and said point of time at which reading said second side begins.

2. An apparatus according to claim 1, wherein said reading means includes a first reading station for reading the first side of said original and a second reading station for reading the second side of said original, said second reading station being located on the downstream side of said first reading station in the moving direction of said original.

3. An apparatus according to claim 1, wherein said reading means includes a common reading station for reading the first and second sides of said original and feeding means for feeding said original again to said reading station after completion of reading said first side.

4. An image forming apparatus according to claim 1, further comprising fixing means for fixing said first and second toner images respectively transferred to the first and second sides of said transfer member, said fixing means being located on the downstream side of said second transfer station in the moving direction of said transfer member, the electric charge polarity of said first toner image transferred to the first side of said transfer member and that of said second toner image transferred to the second side of said transfer member being opposite to each other, and the polarity of a transferring voltage applied to said first transfer means and that of a transferring voltage applied to said second transfer means being opposite to each other.

5. An apparatus according to claim 4, wherein said first image forming means further includes first charging means for electrically charging said first image bearing member, first exposure means for exposing said first image bearing member charged by said first charging means to a first information light flux to form a first electrostatic latent image, and first developing means for supplying a first toner to said first image bearing member to develop said first electrostatic latent image; and wherein said second image forming means further includes second charging means for electrically charging said second image bearing member, second exposure means for exposing said second image bearing member charged by said second charging means to a second information light flux to form a second electrostatic latent image, and second developing means for supplying a second toner to said second image bearing member to develop said second electrostatic latent image.

6. An apparatus according to claim 5, wherein the electric charge polarity of said first image bearing member imparted by said first charging means and that of said second image bearing member imparted by said second charging means are opposite to each other; and wherein the electric charge polarity of said first toner supplied by said first developing means to said first image bearing member and that of said second toner supplied by said second developing means to said second image bearing member are opposite to each other.

7. An apparatus according to claim 5, wherein the electric charge polarity of said first image bearing member imparted by said first charging means is the same as that of said second image bearing member imparted by said second charging means; and wherein the electric charge polarity of said first toner supplied by said first developing means to said first image bearing member is opposite to that of said second toner supplied by said second developing means to said second image bearing member.

8. An apparatus according to claim 5, wherein the electric charge polarity of said first image bearing member imparted by said first charging means is the same as that of said second image bearing member imparted by said second charging means; wherein the electric charge polarity of said first toner supplied by said first developing means to said first image bearing member is the same as that of said second toner supplied by said second developing means to said second image bearing member; and wherein one of said first image forming means and said second image forming means further includes third changing means for inverting, prior to transfer of said associated toner image, the electric charge polarity of the associated toner applied to said associated image bearing member by said associated developing means.

* * * * *

UNITED STATES PATENT AND TRADEMARK OFFICE
CERTIFICATE OF CORRECTION

PATENT NO. : 4,958,187
DATED : September 18, 1990
INVENTOR(S) : HIROAKI TSUCHIYA It is certified that error appears in the above-identified patent and that said Letters Patent is hereby corrected as shown below:

COLUMN 2

Line 26, "image means" should read --image forming means--.

Line 36, "follows" should read --follows:--.

COLUMN 3

Line 2, "drum" should read --drum 11--.

UNITED STATES PATENT AND TRADEMARK OFFICE
CERTIFICATE OF CORRECTION

PATENT NO. : 4,958,187

DATED : September 18, 1990

INVENTOR(S) : HIROAKI TSUCHIYA

It is certified that error appears in the above-identified patent and that said Letters Patent is hereby corrected as shown below:

COLUMN 6

Line 34, "distance (1" should read --distance $\ell_1$--.

Line 35, "distance (2" should read --distance $\ell_2$--.

COLUMN 7

Line 12, "firs" should read --first--.

COLUMN 9

Line 5, "Third changing means" should read --third charging means--.

Signed and Sealed this

Tenth Day of November, 1992

Attest:

DOUGLAS B. COMER

*Attesting Officer*    *Acting Commissioner of Patents and Trademarks*